United States Patent [19]
Collonia

[11] Patent Number: 5,984,319
[45] Date of Patent: Nov. 16, 1999

[54] HOLDING DEVICE

[75] Inventor: Harald Collonia, Lynchburg, Va.

[73] Assignee: American Hofmann Corporation, Lynchburg, Va.

[21] Appl. No.: 09/024,102

[22] Filed: Feb. 17, 1998

[51] Int. Cl.$^6$ .......................... B23B 31/32; G11B 17/022
[52] U.S. Cl. ........................ 279/2.05; 279/4.05; 279/139; 360/99.05; 360/99.12; 369/270
[58] Field of Search ................................. 279/2.05, 4.05, 279/139; 360/99.05, 99.12; 369/261, 270, 271

[56] References Cited

U.S. PATENT DOCUMENTS 2,854,237  9/1958  Richards ................................. 279/4.05

FOREIGN PATENT DOCUMENTS 2269513  11/1990  Japan ..................................... 279/2.05
446383   10/1974  U.S.S.R. ................................ 279/2.05
884880   11/1981  U.S.S.R. ................................ 279/2.05

*Primary Examiner*—Steven C. Bishop
*Attorney, Agent, or Firm*—Hazel & Thomas, P.C.

[57] ABSTRACT

The invention relates to a holding device for balancing disk-like inertial bodies, which comprises at least two clamping elements (8) centered on a center axis (A), such elements (8) having a respective radial abutment face (34), wherein the clamping elements (8) are provided on a connecting part (10) having at least one elastically deformable portion, which connecting part produces an equal shift of all clamping elements (8) on deformation. A connecting part (10) with the clamping elements (8) is provided on an elastically deformable wall (6), which is constituted by a thin-walled diaphragm (6) extending in a radial plane in relation to the center axis (A), such diaphragm being arranged coaxially in relation to the connecting part (10) and the clamping elements (8). Via a pressure chamber (12) formed in the holding device it is possible for both a vacuum and also gage pressure to be applied in order to deform the diaphragm and accordingly to cause both a radial and also an axial shift of the clamping elements (8) arranged on the diaphragm (6).

22 Claims, 3 Drawing Sheets

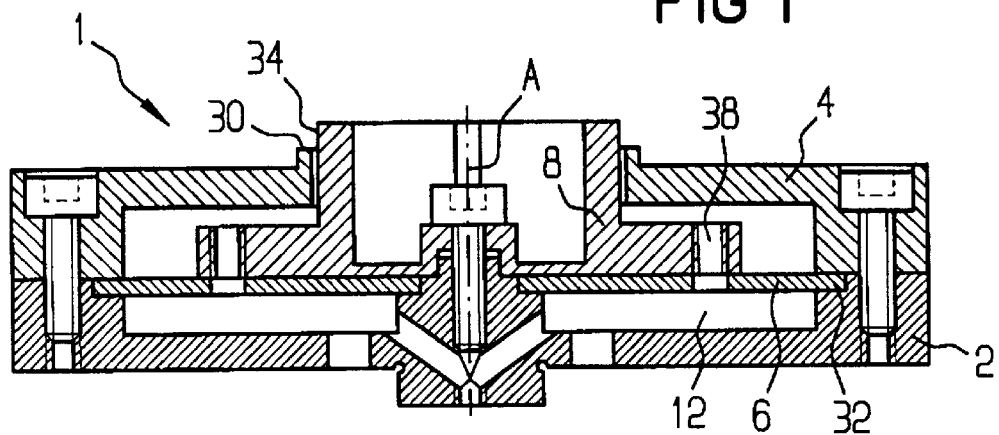
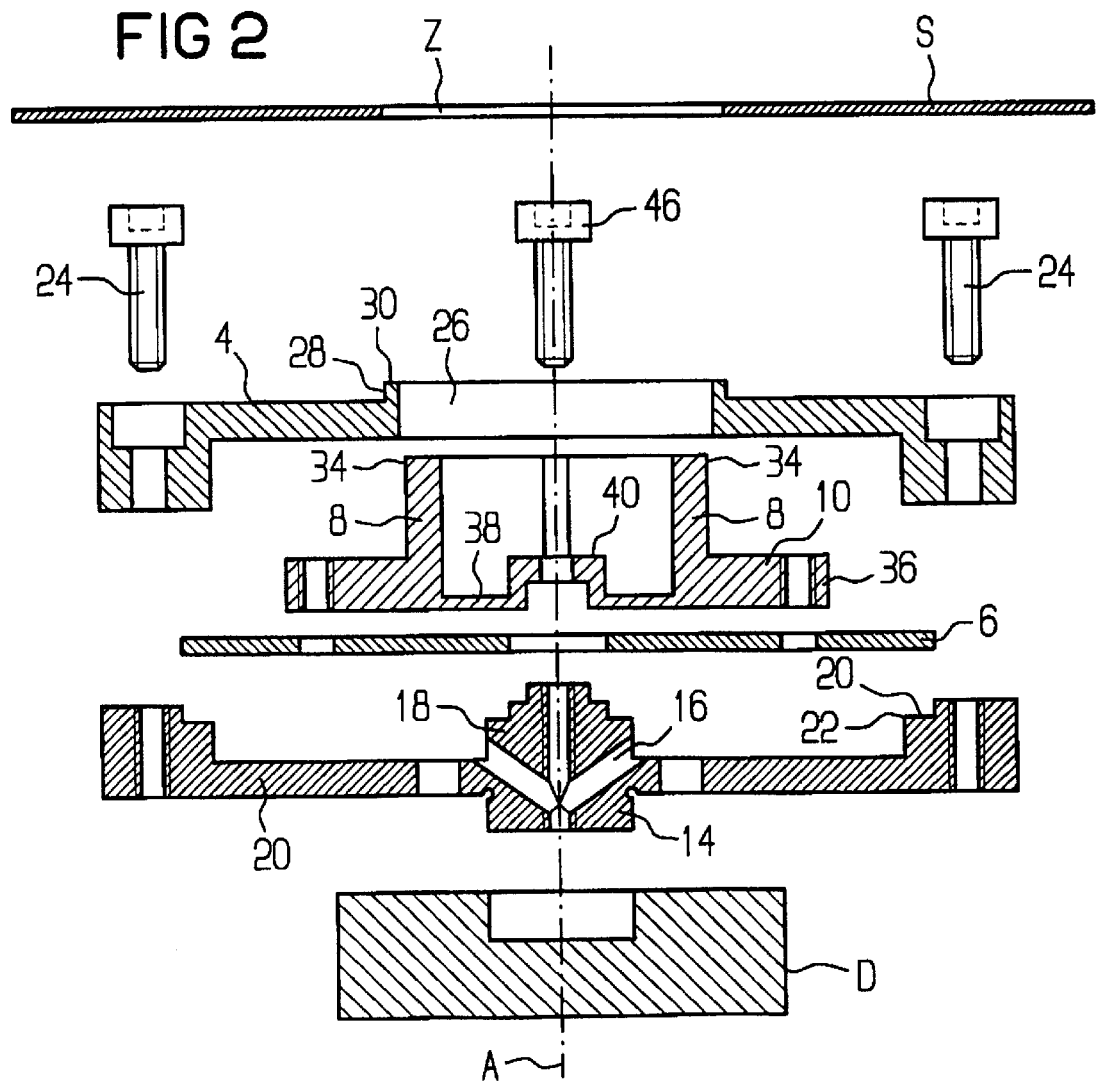

HOLDING DEVICE

TECHNICAL FIELD OF THE INVENTION

The invention relates to a holding device for balancing disk-like inertial bodies.

It is more especially suitable for radially or rotationally symmetrical inertial bodies having a central opening, as for example compact disks (CD's) or storage media for diskette drives, which require a high degree of positional accuracy, and reproducibility thereof when centering the inertial body to ensure a good measurement of imbalance. The positional accuracy and reproducibility thereof relates both to the centering of the disk-like inertial body on an axis of rotation and also the accurate alignment thereof in a radial plane in relation to such axis of rotation.

BACKGROUND OF THE INVENTION

Hitherto for such purposes holding devices were employed, in the case of which the disk-like inertial body, a CD, was held by an annular rib in a radial plane in relation to an axis of spin or a center axis, whereas centering was performed using radial faces or edges, as for instance a central opening in a CD, employing ea conical member. Slight inaccuracies in the central opening in the disk-like inertial body meant that if the diameter was slightly too small there was no longer any axial support so that there was a chance of the assumption of an oblique position in relation to the center axis. On the contrary in the ease of a slightly oversize diameter the disk-like inertial body admittedly bore against the axial support means, but owing to the radial play between the conical member and the radial abutment face on the object or body it could no longer be centered.

In order to tackle this problem there has already been proposed to arrange the conical member in slide guide means so as to bear against a cylindrical spring so that, given a suitably soft design of the spring support, simultaneous engagement against the conical member and an axial support is possible even in the case of varying dimensions for engagement of the disk-like inertial body, but however owing to the possibility of sliding movement of the conical member there is at all times a small amount of play between the latter and the guide thereof, such play impairing the reproducibility of positional accuracy and during rotation of The disk-like inertial body this will lead to additional signs of imbalance.

In the case of a typical storage medium disk with a weight of 10 g the balance tolerance of the inertial body itself amounts to 0.375 gmm. This results in a permissible eccentricity of 0.0375 mm, i. e. 37.5 micrometers. In order to obtain an accuracy of repetition of for example 10% GR+R (gage repeatability and reproducibility), it is even necessary for the accuracy of centering of the inertial body itself to be 10 times better than the permissible eccentricity, i. e. more accurate than 3.7 micrometers. This goes to show that even extremely small play tolerances in a centering conical member will have a substantial effect on the accuracy of repetition.

SUMMARY OF THE INVENTION

In view of the above, it is one object of the invention to provide a holding device for balancing disk-like inertial bodies, which renders possible a highly accurate centering of the inertial body for balancing.

It is another more specific object of the invention to ensure a precise positional accuracy and reproducibility of a holding device for balancing disk-like inertial bodies.

It is still another more specific object of the invention to provide a holding device for balancing disk-like inertial bodies which renders it possible to arrange a disk-like inertial body loosely between the radial abutment faces so that the corresponding abutment edges of the inertial body itself are not damaged.

It is still another more specific object of the invention to provide a holding device for balancing disk-like inertial bodies in which a slight variation in the dimensions of the abutment edges on the object will not impair the positional accuracy.

It is still another more specific object of the invention to provide a holding device for balancing disk-like inertial bodies in which play tolerances, as for example occur in the prior art, may be completely avoided.

These and other object are to be attained by a holding device for balancing disk-like inertial bodies, which comprises at least two clamping elements centered with respect to a center axis and each having a radial abutment face, in the case of which the clamping elements are provided on a connecting part having at least one elastically deformable portion, which on deformation leads to an equal shift of all clamping elements.

The above and other object are to be attained in particular also by an holding device for disk-like inertial bodies with a central opening, which comprises eat least two clamping elements arranged concentrically around a center axis and each having a radial abutment face, in the case of which the clamping elements are each provided on a connecting part having at least one elastically deformable portion, which connecting part on deformation produces an even radial shift of all clamping elements, the clamping elements and the collecting part being produced integrally together and for each clamping element the connecting part comprises a rib extending radially away from the center axis toward the respective damping element, and the connecting part being provided with the clamping jaws of an elastically deformable diaphragm of a pressure chamber formed in the holding device.

The above and other object are to be attained in particular also by a holding device for disk-like inertial bodies with a central opening, which comprises at least two identically designed clamping elements, which are centered with respect to a center axis and each have a radial abutment face, in the case of which the clamping elements are provided on a connecting part possessing at least one elastically deformable portion, which connecting part on deformation produces an equal radial shift of all clamping elements, the clamping elements being integral with each other and the connecting part having for each clamping element a rib extending radially from the center axis toward the respective clamping element, all ribs being identical in design and an inertial body carrier being provided, which together with a base part forms a housing centered on the center axis, in which housing the clamping elements are received together with connecting part, the inertial body carrier having at least one opening, through which abutment faces of the clamping elements extend out from the housing past an axial abutment faces on the housing, and the axial abutment face being provided on the end face of an annular projection, which extends around a central opening in the inertial body past the external wall thereof.

The holding device of the invention renders it possible to arrange a disk-like inertial body loosely between the radial abutment faces so that the corresponding abutment edges of the inertial body itself are not damaged. In the course of following deformation the inertial body is centered by the even radial shifting movements of the clamping elements, which each also have an additional axial component toward the center axis of the holding device. Accordingly a slight variation in the dimensions of the abutment edges on the object will not impair the positional accuracy.

The disk-like inertial body can be gripped both at radially internal edges, for example of a central opening, and also just as well at radially external edges thereof. In order to render possible introduction of the inertial body without of obstruction, the clamping elements are for this purpose brought into a position in which they are somewhat drawn apart and for centering they are relieved again, or however, the clamping elements may be introduced in the load-free state, the elements being relieved for centering the inertial body. The transfer of the clamping forces to the clamping elements is in this case due to the deformation of the elastically deformable connecting part directly connecting the same.

It is preferred for the clamping elements and the connecting part to be designed integrally with each other. This means that play tolerances, as for example occur in the prior art, may be completely avoided.

Preferably the elastically deformable portions of the connecting part extend substantially in a radial plane in relation to the center axis- This results in a particularly flat design while at the same time producing a large radial shifting displacement of the clamping elements.

In accordance with an advantageous further development of the invention for the clamping elements the connecting part comprises ribs extending radially from the center axis to the respective clamping elements, such ribs rendering possible an elastic deformation.

According to an advantageous further development of the invention the ribs possess a uniform shape and a uniform spring constant in the axial direction in order to ensure an even deformation of the clamping elements.

According to an advantageous development the connecting part with the clamping elements is provided on a elastically deformable wall of a pressure chamber formed in the holding device. The connecting part may in this case be integrated in the elastically deformable wall or, however, also be applied to the latter as a separate part.

In order to render possible a particularly large radial shifting displacement of the clamping elements the elastically deformable wall is designed in the form of a thin-walled diaphragm extending in a radial plane in relation to the center axis, such diaphragm being arranged coaxially to the connecting part and the clamping elements.

According to an advantageous development of the invention the holding means furthermore comprises an inertial body carrier, which is coupled with the base part, for example by a screw connection, so that both parts together constitute a housing centered on the center axis, in which housing the clamping elements are received with the connecting part. The inertial body has at least one opening, through which the abutment faces on the clamping elements protrude out of the same past an axial abutment or, respectively, support face for the disk-like inertial body. Owing to the housing-like design the clamping elements and the connecting part are encapsulated and protected against ingress of extraneous matter.

Preferably the abutment faces are provided radially externally on the clamping elements. In accordance with an alternative embodiment the abutment faces are provided radially internally on the clamping bodies so that the disk-like inertial body may be clamped by engagement with its outer edges. This offers the advantage that if there are dimensional errors in a central opening the imbalance effects occurring will remain smaller than in the case of clamping using a central opening. Furthermore, the alternative embodiment renders possible the clamping in place of inertial bodies without any central opening.

In accordance with an advantageous further development of the invention the support face for the disk-like inertial body is provided at the terminal face of an annular projection, which extends concentrically to the center opening in the inertial body carrier and projects past the external wall thereof The narrow annular projection in the central portion of the inertial body renders possible a particularly accurate alignment of the inertial body in a radial plane in relation to the center axis, since in the case of high speeds of revolution self-alignment may then take place unhindered- Furthermore, more particularly in the case of the use of a diaphragm, the axial component of the shift of the clamping elements on actuation thereof will be caused to take effect in an optimum fashion, because the central portion of the disk-like inertial body is clamped against the annular projection.

These and various other advantages and features of novelty which characterize the present invention are pointed out with particularity in the claims annexed hereto and forming a part hereof. However, for a better understanding of the invention, its advantages, and the object obtained by its use, reference should be made to the drawings which form a further part hereof, and to the accompanying descriptive matter in which there are illustrated and described preferred embodiments of the present invention.

BRIEF DESCRIPTION OF THE DRAWINGS

In the following preferred embodiments of the invention will be described in detail with reference to the drawings.

FIG. 1 shows an embodiment of the holding device.

FIG. 2 is an exploded showing of the embodiment illustrated in FIG. 1.

DETAILED DESCRIPTION OF THE PREFERRED EMBODIMENTS

Figure 3:
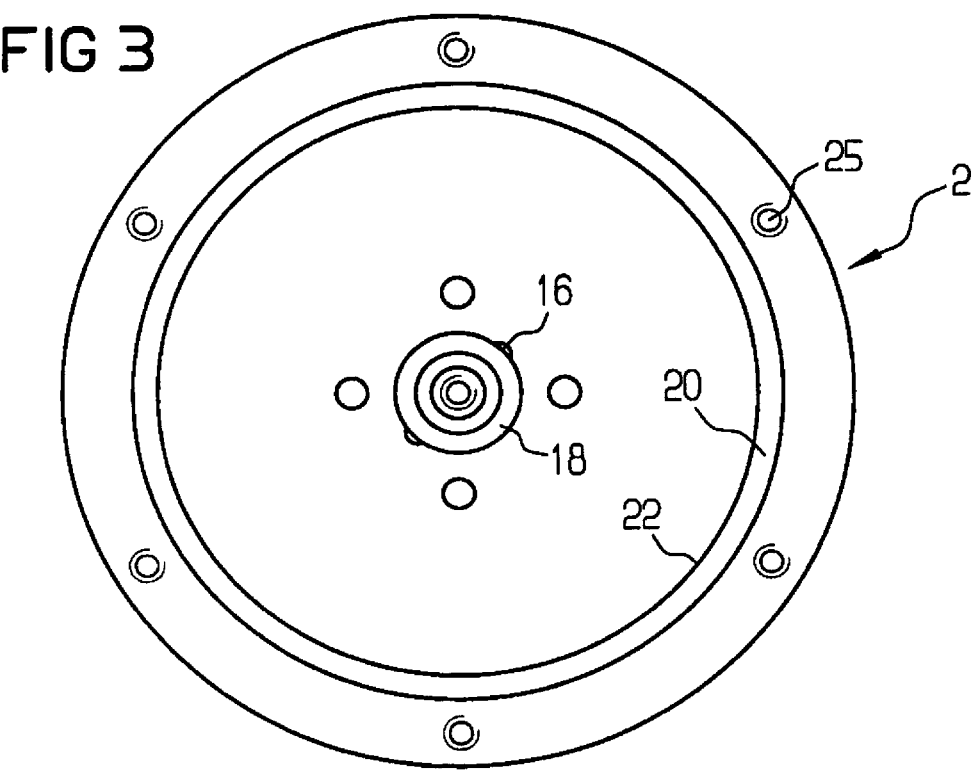
FIG. 3 is a plan view of the base part of the holding device.
Figure 4:
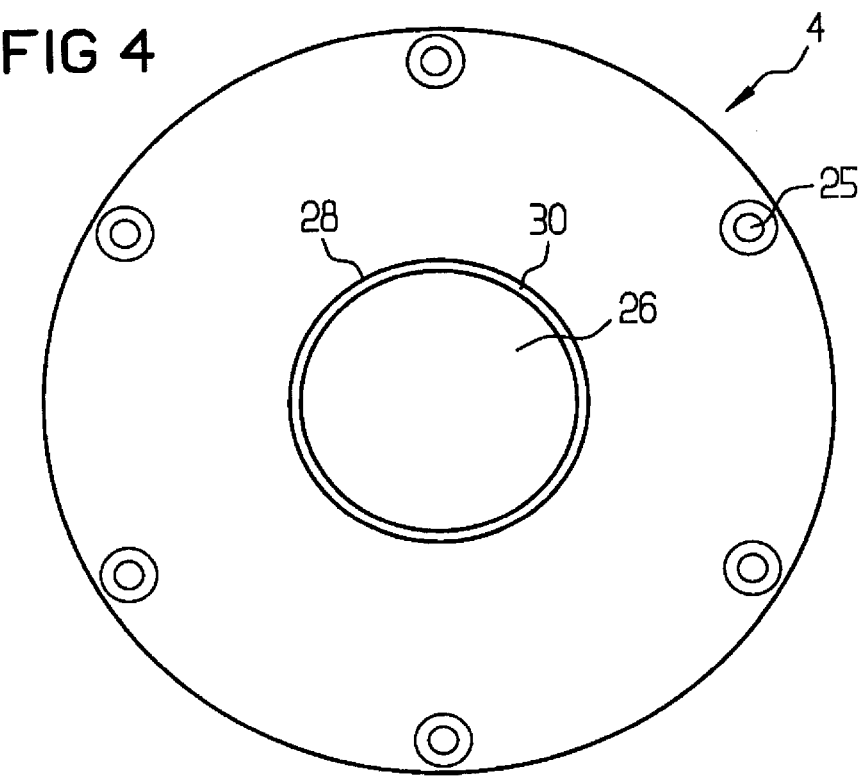
FIG. 4 is a plan view of the inertial body carrier of the holding device.

The holding device 1 illustrated in FIG. 1 comprises a base part 2 and furthermore an inertial body carrier 4 for supporting a disk-like inertial body S with a central opening Z, which together constitute a radially or rotationally symmetrical housing free of imbalance centered on the center axis of the holding device 1. Between the base part 2 and the inertial body carrier 4 an elastic wall in the form of a diaphragm 6 is clamped, which together with the base part 2 delimits a pressure chamber 12 formed in the holding device 1.

Furthermore a clamp part is provided within the housing possessing, in the illustrated embodiment of the invention, three clamping elements 8 and furthermore a connecting part 10 connecting such clamping elements 8. The clamp part is made integrally, that is to say the clamping elements 8 and the connecting part 10 are manufactured from a single piece of material so that inaccuracies of manufacture due to assembly between the clamping elements 8 and the connecting part 10 are avoided.

The base part 2 is designed in the form of a round plate and delimits the pressure chamber 12 in the axial and in the radial direction. On its external side opposite to the inertial body carrier 14 the base part 2 comprises a holding projection 14, via which the base part may be coupled with a rotary spindle D of a drive device. A central pressure open is provided in this holding projection 14, from which opening pressure supply ducts 16, evenly distributed about the periphery, lead to the pressure chamber 12, It is by way of these pressure supply ducts 16 that the pressure chamber may be supplied both with vacuum and also with gage pressure in order to deform the diaphragm 6 and thus to cause a radial and also an axial shift to of the clamping elements 8 provided thereon.

On the opposite side of the holding projection 14 a central stay portion 18 is provided on the base part, such stay portion 18 extending past the internal floor face of the base part 2 and serving for supporting a central portion of the diaphragm 6. On the external annular portion of the base part, which radially delimits the pressure chamber 12, there is furthermore a diaphragm holding recess 20 in the form of an annular ledge centered on the center axis A, the radially internal support edge 22 of the ledge being centered on the center axis so that the elastically deformable portion of the diaphragm 6 has its entire periphery at the same distance from the center axis A.

The inertial body carrier 4 is also designed in the form of a plate and in the assembled state of the holding device has an external annular flange bearing against the base part 2. The connection between the base part 2 and the inertial body carrier 4 is by means of six bolts 24 evenly disposed about the periphery and corresponding holes 25. Furthermore the inertial body carrier 4 comprises a through opening 26 centered on the center axis A, whose diameter is so selected that a movement of the clamping elements or clamping jaws 8 extending through such opening is not hindered.

In the illustrated working embodiment, in the case of which the clamping elements are moved radially outward for centering the disk-like inertial body S, a corresponding radial intermediate space in the form of an annular gap is provided. Around such through opening 26, on the external side of the inertial body carrier 4, that is to say on the side facing the clamped inertial body, an annular projection 28 extends and also extends past the external wall of the inertial body carrier 4. This annular projection 28 comprises an axial support face 30 for supporting the inertial body S to be clamped in place. The support face 30 extends here in a radial plane in relation to the center axis A.

The diaphragm 6 is formed as thin-walled disk able to be elastically deformed in the plane in which it extends and is installed radially in relation to the center axis A. Its radially external attachment is at a clamped edge 32, which is held between the base part 2 and the inertial body carrier 4.

In the illustrated working embodiment the clamp part comprises three clamping elements 8 in the form of sectors of a circle, which are designed in the form of circular ring segments extending essentially in an axial direction. At the portion which in the assembled state extends past the axial support face 30, on their radially external side the clamping elements 8 respectively possess an abutment face 34, which serves for abutment against a radial abutment face or, respectively abutment edge of the central opening Z in the disk-shaped inertial body S. The clamping elements 8 are respectively connected with a flange-like attachment portion 36, which is coupled with the diaphragm 6 by bolts 28.

Figure 5:
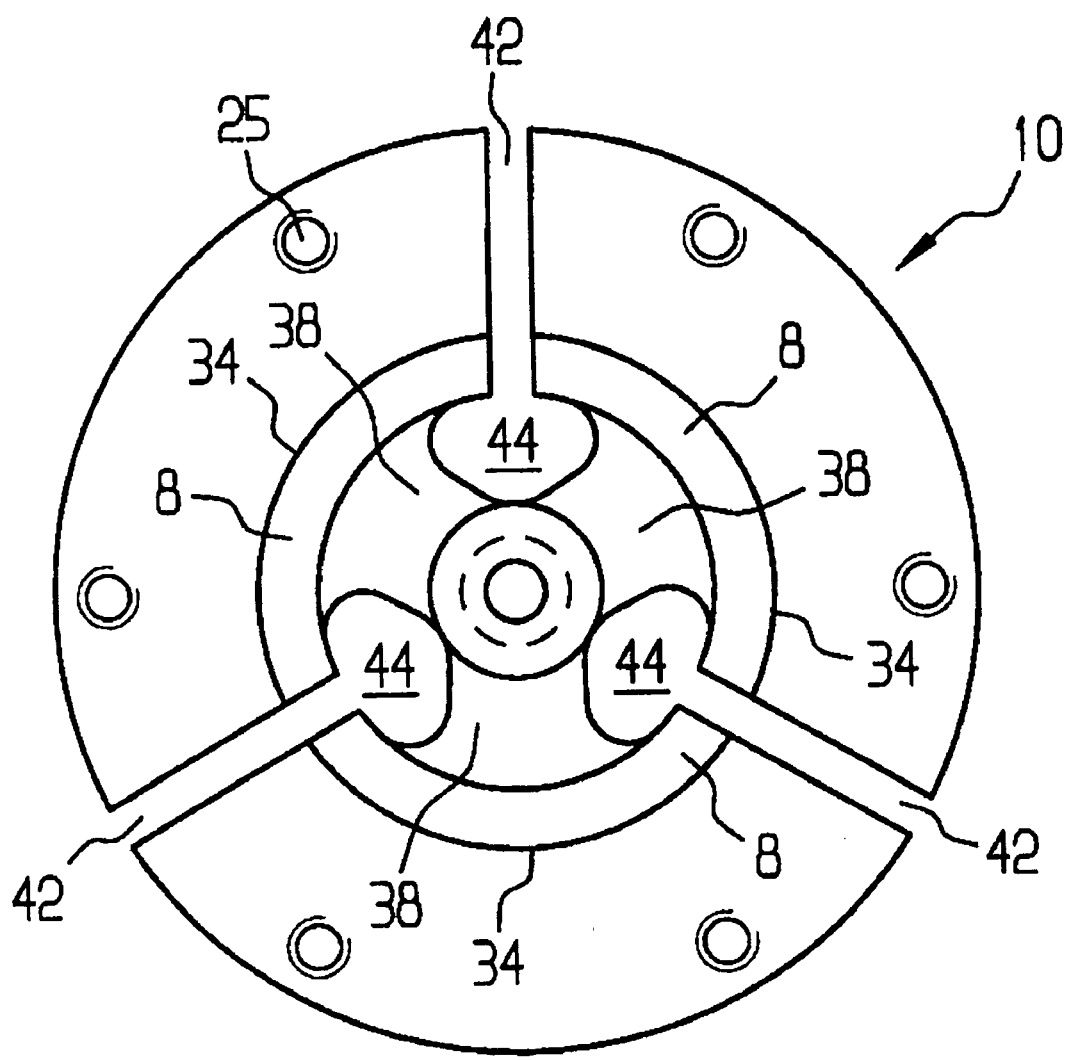
FIG. 5 is a plan view of the clamping elements with the connecting part of the embodiment shown in FIG. 1.

The clamping elements 8 are integrally connected with each other by means of a connecting part 10. The connecting part 10 comprises a central portion, from which, a number dependent on the number of clamping elements, in the present case three, ribs 38 extend radially toward the clamping elements 8. As shown in FIG. 5, all clamping elements 8, including the flange-like attachment portions 36 and the ribs 38 are identical in design, The individual ribs 38 or, respectively, the clamping elements 8 are separated from one another by grooves 42 and by heart-like recesses 44. The heartlike recesses in the vicinity of the elastically deformable portions of the connecting part 10, that is to say the rib, are responsible for a constriction in cross section of the ribs toward the middle thereof so that same may be deformed without hindrance in the axial direction. For this purpose the ribs 38 are made with thinner walls than the central portion 40 of the connecting part 10.

The entire clamp part is free of imbalance in relation to the central axis A. In order to maintain a high degree of dimensional accuracy during manufacture of the individual segments firstly the heart-shaped recesses 44 are produced, as for example milled, and then afterwards the grooves 42.

The clamp part together with the diaphragm 6 is clamped using a central bolt 48 against the central stay portion 18 of the base part 2. Following this it is possible for the inertial body carrier 4 to be put on and to be connected with the base part 2 using the bolts 24.

In what follows a short account will be given of the manner of functioning of the holding device depicted in FIG. 1. FIG. 1 shows the centering holding means in its relieved state, that is to say with the diaphragm 6 not deformed. In this state it is possible for a disk-like inertial body S (as for instance a CD) with a central opening Z to be placed loosely over the abutment faces 34 and to be deposited on the axial abutment face 30 of the inertial body carrier 4. For centering the inertial body S the pressure chamber 12 is then put under vacuum so that the diaphragm is deformed evenly toward the pressure chamber 12, that is to say downward in terms of FIG. 1.

The clamping elements 8 connected with the diaphragm are pivoted with the deformation of the diaphragm and perform a radially outwardly directed motion, on which there is superimposed an axial component directed axially in relation to the abutment face 30. Owing to this movement of the clamping elements 8 and owing to corresponding abutment faces 34 provided thereon there is not only a centering of the inertial body S in relation to the center axis A but at the same time furthermore a light pressing action of the inertial body against the axial abutment face 30 and accordingly an exact alignment in a radial plane in relation to the center axis A. In order to ensure a precisely equal movement of all clamping elements 8 there is in addition to the completely identical design of all clamping elements more particularly the integral connection of the same by means of the connecting part 10 and more especially its elastically deformable portions in the form of the ribs 88. This means that even slight irregularities in the deformation of the diaphragm 6 are compensated for so that an extremely even movement of the clamping jaws or, respectively, of the clamping elements 8 is ensured. On the whole there is an extremely accurate setting of tie position of the disk-like inertial body, which may be reproduced with great accuracy and which minimizes the influence of imbalance forces during rotation of the holding device.

To remove the inertial body the vacuum action in the pressure chamber 12 is terminated so that the clamping elements 8 return to their position depicted in FIG. 1 and the inertial body S may be removed without any trouble. The holding device comprises at least two clamping elements which are arranged concentrically around the centre axis A and which elements are intergrally connected to each other by an elastically deformable connecting part 10.

The connecting part with the clamping elements is provided on the external wall of a pressure chamber 12. On application of vacuum the clamping elements perform an extremely even radial movement for centering the inertial body so that a highly accurate setting of the position of the inertial body is rendered possible, such position being free of imbalance on rotation of the holding device. More particularly the holding device is suitable for centering CDs or other disk-like data storage media.

New characteristics and advantages of the invention covered by this document have been set forth in the covered by this document have been set forth in the foregoing description. It will be understood, however, that this desclosure is, in many respects, only illustrative. Changes may be made in details, particularly in matters of shape, size, and arrangement of parts, without exceeding the scope of the invention. The scope of the invention is, of course, defined in the language in which the appended claims are expressed.

What is claimed is:

1. A holding device for balancing disk-like inertial bodies, comprising at least two clamping elements centered with respect to a center axis and each having a radial abutment face, wherein:
   the clamping elements are provided on a connecting part having at least one elastically deformable portion, which connecting part produces an equal shift of all clamping elements on deformation;
   the clamping elements and the connecting part are made integral with one another;
   the elastically deformable portions of the connecting part extend essentially in a radial plane in relation to the center axis;
   for each clamping element the connecting part comprises a thin-walled rib, the ribs having a uniform shape and a uniform spring constant in the axial direction;
   the connecting part on deformation produces an even radial as well as axial shift of the clamping elements; and
   the connecting part with the clamping elements is provided on an elastically deformable, thin-walled diaphragm, said diaphragm extending from a radial plane in relation to the center axis and being arranged coaxially in relation to the connecting part and the clamping elements.

2. The holding device as claimed in claim 1, wherein said ribs have a constriction in cross section toward the middle thereof and extending radially from the center axis toward the respective clamping element.

3. The holding device as claimed in claim 1, wherein the pressure chamber is delimited by the diaphragm and a base part, the diaphragm being supported on an abutment edge on the base part, said abutment edge being centered on the center axis.

4. The holding device as claimed in claim 1, which further comprises an inertial body carrier which is coupled with the base part so that they together constitute a housing centered on the center axis, in which housing the clamping elements are accommodated with the connecting part, the inertial body carrier having at least one opening through which abutment faces of the clamping elements extend out from the inertial body carrier past an axial support face on the inertial body carrier.

5. The holding device as claimed in claim 4, wherein the abutment faces are provided radially externally on the clamping elements.

6. The holding device as claimed in claim 4, wherein the axial support face is provided on the terminal face of an annular projection, said annular projection extending around a central opening in the inertial body carrier and past the external wall of the inertial body carrier.

7. The holding device as claimed in claim 1, wherein the diaphragm is held by having a radially external edge thereof clamped between the base part and the inertial body carrier.

8. A holding device for balancing disk-like inertial bodies comprising at least two clamping elements arranged concentrically around a center axis and each having a radial abutment face, wherein:
   the clamping elements are each provided on a connecting part having at least one elastically deformable portion comprising a thin-walled rib for each clamping element, which connecting part on deformation produces an even radial as well as axial shift of the clamping elements, the clamping elements and the connecting part being produced integrally together;
   the ribs extend radially away from the center axis toward the respective clamping element, the ribs possessing a uniform shape and a uniform spring constant in the axial direction; and
   the connecting part with the clamping jaws is provided on an elastically deformable diaphragm of a pressure chamber formed in the holding and extending in a radial plane in relation to the center axis and being arranged coaxially in relation to the connecting part and the clamping elements.

9. The holding device as claimed in claim 8, wherein the elastically deformable portions of the connecting part extend essentially in a radial plane in relation to the center axis.

10. The holding device as claimed in claim 8, wherein said ribs have a constriction in cross section toward the middle thereof and extending radially from the center axis toward the respective clamping element.

11. The holding device as claimed claim 8, wherein the pressure chamber is delimited by the diaphragm and a base part, the diaphragm being supported on an abutment edge on the base part, said abutment edge being centered on the center axis.

12. The holding device as claimed in claim 8, which further comprises an inertial body carrier which is coupled with the base part so that they together constitute a housing centered on the center axis, in which housing the clamping elements are accommodated with the connecting part, the inertial body carrier having at least one opening through which abutment faces of the clamping elements extend out from the inertial body carrier past an axial support face on the inertial body carrier.

13. The holding device as claimed in claim 12, wherein the abutment faces are provided radially externally on the clamping elements.

14. The holding device as claimed in claim 12, wherein the axial support face is provided on the terminal face of an annular projection, said annular projection extending around a central opening in the inertial body carrier and past the external wall of the same.

15. The holding device as claimed in claim 8, wherein the diaphragm is held by having a radially external edge thereof clamped between the base part and the inertial body carrier.

16. A holding device for balancing disk-like inertial bodies with a central opening comprising at least two identically designed clamping elements, which are centered with respect to a center axis and each have a radial abutment face, wherein:

the clamping elements are provided on a connecting part having at least one elastically deformable portion, which connecting part on deformation produces an equal radial as well as axial shift of all clamping elements, the clamping elements being integral with each other;

the connecting part having for each clamping element a rib extending radially from the center axis toward the respective clamping element, all ribs being identical in design;

an inertial body carrier is further provided, which together with a base part forms a housing centered on the center axis, in which housing the clamping elements are received together with the connecting part, the inertial body carrier having at least one opening, through which abutment faces of the clamping elements extend out from the housing past an axial abutment face on the housing, the axial abutment face provided on the end face of an annular projection, which extends around a central opening in the inertial body past the external wall thereof; and the connecting part with the clamping elements is provided on an elastically deformable thin-walled diaphragm, said diaphragm extending in a radial plane in relation to the center axis and being arranged coaxially in relation to the connecting part and the clamping elements.

17. The holding device as claimed in claim 16, wherein the elastically deformable portions of the connecting part extend essentially in a radial plane in relation to the center axis.

18. The holding device as claimed in claim 16, wherein said ribs have a constriction in cross section toward the middle thereof and extending radially from the center axis toward the respective clamping element.

19. The holding device as claimed in claim 18, wherein the ribs have a uniform shape and a uniform spring constant in the axial direction.

20. The holding device as claimed claim 16, wherein the pressure chamber is delimited by the diaphragm and a base part, the diaphragm being supported on an abutment edge on the base part, said abutment edge being centered on the center axis.

21. The holding device as claimed in claim 16, wherein the abutment faces are provided radially externally on the clamping elements.

22. The holding device as claimed in claim 16, wherein the diaphragm is held by having a radially external edge thereof clamped between the base part and the inertial body carrier.

* * * * *